United States Patent
Foley et al.

(10) Patent No.: US 11,728,606 B2
(45) Date of Patent: Aug. 15, 2023

(54) FLEXIBLE CONNECTOR MECHANISM FOR LIGHT ELECTRICAL VEHICLES

(71) Applicant: NEUTRON HOLDINGS, INC., San Francisco, CA (US)

(72) Inventors: Nick Foley, San Francisco, CA (US); Andrew Titus, San Francisco, CA (US); Shai Schechter, Brooklyn, NY (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 17/246,363

(22) Filed: Apr. 30, 2021

(65) Prior Publication Data
US 2021/0344152 A1 Nov. 4, 2021

Related U.S. Application Data

(60) Provisional application No. 63/019,040, filed on May 1, 2020.

(51) Int. Cl.
*H01R 35/02* (2006.01)
*H01R 13/52* (2006.01)
(Continued)

(52) U.S. Cl.
CPC .............. *H01R 35/02* (2013.01); *B60L 53/80* (2019.02); *H01M 50/249* (2021.01); *H01M 50/521* (2021.01); *H01R 13/5219* (2013.01); *H01R 13/6315* (2013.01); *H01R 43/26* (2013.01); *B60L 50/66* (2019.02); *B60L 2200/12* (2013.01); *H01M 2220/20* (2013.01); *H01R 2201/26* (2013.01)

(58) Field of Classification Search
CPC ...... H01R 35/02; B60L 53/80; H01M 50/249; H01M 50/521
USPC .......................................................... 439/248
See application file for complete search history.

(56) References Cited

U.S. PATENT DOCUMENTS 8,413,947 B2 * 4/2013 Chiang ................. H01M 50/20
206/703
8,685,569 B2 * 4/2014 Oguni ................... H01M 4/626
429/245

(Continued)

FOREIGN PATENT DOCUMENTS

EP 2280436 B1 8/2017
GB 2572466 A 10/2019

*Primary Examiner* — Alexander Gilman
(74) *Attorney, Agent, or Firm* — Dentons US LLP

(57) ABSTRACT

Examples of the present disclosure describe a flexible connector mechanism that may be used to form an electrical connection and/or a communication link between one or more devices. The flexible connector mechanism may comprise one or more interface components that may each comprise one or more contact portions. The interface components may be configured to be selectively coupled to one or more corresponding components of a coupleable object. The flexible connector mechanism may also comprise a flexible portion that enables the interface components to be manipulated along one or more planes or axes. The flexibility of the flexible portion may enable the interface components of the flexible connector mechanism to be adjusted into, and maintained in, an optimal (or operable) position when coupled to a coupleable object in motion.

20 Claims, 7 Drawing Sheets

(51) Int. Cl.
  *H01R 43/26*  (2006.01)
  *H01R 13/631*  (2006.01)
  *H01M 50/521*  (2021.01)
  *B60L 53/80*  (2019.01)
  *H01M 50/249*  (2021.01)
  *B60L 50/60*  (2019.01)

(56) References Cited

U.S. PATENT DOCUMENTS

| | | | | |
|---|---|---|---|---|
| 8,979,110 | B2 * | 3/2015 | Talavasek | B62K 19/40 |
| | | | | 280/279 |
| 9,302,735 | B2 * | 4/2016 | Tagaya | B62M 6/90 |
| 9,611,003 | B1 * | 4/2017 | Yu | B62M 6/90 |
| 9,950,602 | B2 * | 4/2018 | Duan | H01M 50/20 |
| 10,183,591 | B2 * | 1/2019 | Shieh | B62K 25/30 |
| 10,513,310 | B2 * | 12/2019 | Fujiwara | B62M 6/90 |
| 10,926,824 | B2 * | 2/2021 | Hines | B62J 43/20 |
| 11,021,212 | B2 * | 6/2021 | Shimoda | B62J 43/28 |
| 11,024,917 | B2 * | 6/2021 | Trif | B62J 43/23 |
| 2003/0170531 | A1 * | 9/2003 | Bean | H01M 50/24 |
| | | | | 429/100 |
| 2004/0013938 | A1 * | 1/2004 | Murashige | H01M 10/625 |
| | | | | 429/96 |
| 2010/0183910 | A1 * | 7/2010 | Nishino | H01M 50/213 |
| | | | | 429/163 |
| 2010/0237585 | A1 * | 9/2010 | Binggeli | B62K 19/30 |
| | | | | 280/288.4 |
| 2011/0042156 | A1 * | 2/2011 | Vincenz | B62H 5/001 |
| | | | | 224/412 |
| 2012/0070718 | A1 * | 3/2012 | Motohashi | H01M 50/258 |
| | | | | 429/163 |
| 2012/0145852 | A1 * | 6/2012 | Chiang | H01M 50/20 |
| | | | | 248/220.21 |
| 2013/0118825 | A1 * | 5/2013 | Kwag | H01M 10/425 |
| | | | | 429/7 |
| 2014/0329119 | A1 * | 11/2014 | Tirone | H01M 50/20 |
| | | | | 429/96 |
| 2016/0311494 | A1 * | 10/2016 | Schliewert | B62K 19/40 |
| 2017/0073042 | A1 * | 3/2017 | Evensen | H01M 50/20 |
| 2020/0212395 | A1 * | 7/2020 | Durkee | H01M 50/20 |
| 2021/0053407 | A1 * | 2/2021 | Smith | B25J 9/1697 |
| 2021/0265607 | A1 * | 8/2021 | Bosscher | B62J 43/28 |
| 2021/0323424 | A1 * | 10/2021 | Montague | B60L 53/60 |
| 2021/0344152 | A1 * | 11/2021 | Foley | H01R 35/02 |
| 2022/0045407 | A1 * | 2/2022 | Akizuki | H01M 50/474 |
| 2022/0045408 | A1 * | 2/2022 | Akizuki | H01M 50/119 |

* cited by examiner

FLEXIBLE CONNECTOR MECHANISM FOR LIGHT ELECTRICAL VEHICLES

CROSS-REFERENCE TO RELATED APPLICATION

This application claims priority to and the benefit of U.S. Provisional Application No. 63/019,040 filed on May 1, 2020, the disclosure of which is hereby incorporated by reference herein in its entirety.

BACKGROUND

Electric vehicles (e.g., scooters, bicycles, etc.) are typically powered by a power source, such as one or more batteries. In many instances, the power source may be removably coupled to an electric vehicle to enable, for example, recharging, maintaining, or replacing the power source. Often, a power source may be suboptimally coupled to an electric vehicle for one or more reasons. The suboptimal coupling may result in the degradation, destruction, or inoperability of the power source and/or electric vehicle.

SUMMARY

Examples of the present disclosure describe a flexible connector mechanism that may be used to form an electrical connection and/or a communication link between one or more devices. As will be described herein, the flexible connector mechanism may comprise one or more interface components that may each comprise one or more contact portions. The interface components may be configured to be selectively coupled to one or more corresponding components of a coupleable object (e.g., mechanism, component, device, or the like). When coupled to a coupleable object, the contact portion(s) of the flexible connector mechanism and the connectors of the coupleable object may be mated or aligned. The flexible connector mechanism may also comprise a flexible portion that enables the interface components (or portions of the flexible connector mechanism) to be manipulated along one or more planes or axes. The flexibility of the flexible portion may enable the interface components of the flexible connector mechanism to be adjusted into, and maintained in, an optimal (or improved) mating/alignment position when coupled to the coupleable object.

Examples of the present disclosure further describe a method for coupling interfacing components using the flexible connector mechanism described herein. According to examples, the method includes receiving, by the flexible connector mechanism, a coupleable power source. In some examples, the flexible connector mechanism may be implemented by an object, such as a light electric vehicle (or some component thereof). In such examples, the power source may be used to power the object. Upon receiving the power source, the flexible connector mechanism may be manipulated to receive the power source. The manipulation of the flexible connector mechanism may compensate for a suboptimal placement of the power source while the power source is being received. Such compensation by the flexible connector mechanism may enable the power source to be optimally or operationally coupled to the object. In some examples, the flexible connector mechanism limits or prevents the ingress of substances (e.g., water, dust, etc.) while the power source and the object are coupled. After the power source has been coupled to the object, the flexible connector mechanism may be automatically manipulated (e.g., without manual intervention) to enable the power source and the object to remain coupled while the object is in motion or is being operated by a user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional optional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
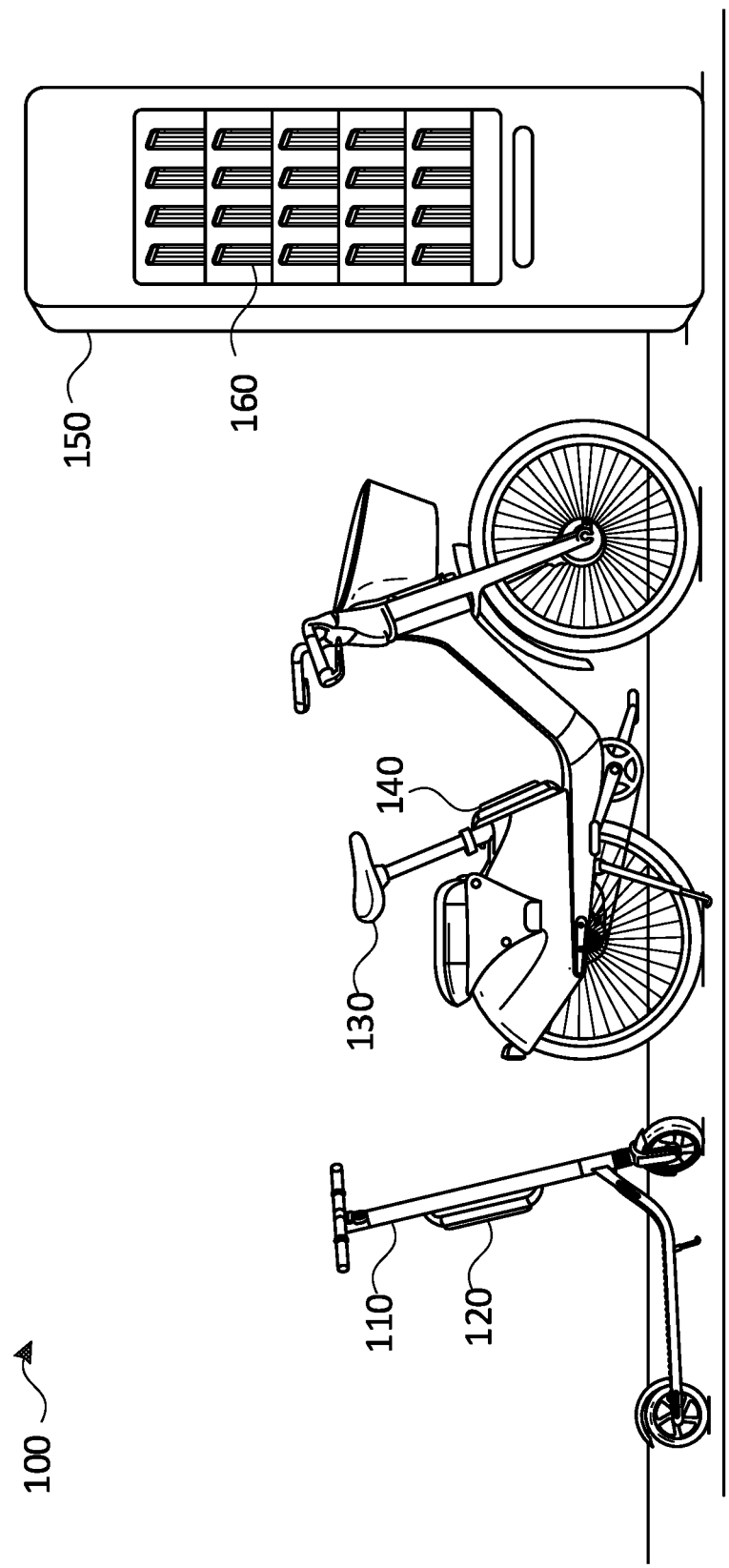
FIG. 1 illustrates an overview of an example system comprising a flexible connector mechanism according to one or more examples.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Examples of the present disclosure describe a connector mechanism that may be used to form an electrical connection and/or a communication link between one or more objects or devices. In examples, the connector mechanism may be disposed on an electronic module located on, or affixed to, a light electric vehicle. The connector mechanism may comprise one or more interface components that may each comprise one or more contact portions. The interface components may be configured to be removably coupled to one or more corresponding components of an alternate device, such as a battery unit. For example, the connector mechanism may include a female connector having one or more recessed holes comprising contact portions, such as electrical terminals. An alternate device may include a male connector having exposed contact portions. The male connector may be inserted into the female connector to couple the electronic module to the alternate device.

The flexible connector mechanism may also comprise a flexible portion that enables the interface components of the flexible connector mechanism to be manipulated about one or more planes or axes. For example, the flexible portion may enable the interface components to be manipulated about three axes of linear motion and/or three degrees of rotational freedom prior to and after being coupled to an alternate device. The interface components may be disposed on the flexible portion or disposed on the flexible connector mechanism such that manipulating the flexible portion causes manipulation of the interface components. The flexibility afforded by the flexible portion may enable the interface components of the connector mechanism to be manipulated into an optimal (or improved) alignment when coupled to the alternate mechanism. Additionally, the flexibility afforded by the flexible portion may enable the electronic module to remain coupled to the alternate device when an electric module is in motion. For example, the flexible portion may enable a battery to remain electrically connected to a light electric vehicle while the light electric vehicle is in motion (e.g., being operated by a user, or otherwise being motionally manipulated). In some examples, the flexible portion may limit or prevent the ingress of substances (e.g., water, dust, etc.), while the alternate device and the electric module are coupled.

Accordingly, the present disclosure provides a plurality of technical benefits including but not limited to: enabling an electrical connection to be maintained between two or more components while one or more of the components is in motion, enabling devices to be manipulated about various degrees of rotation and/or linear motion while electrically coupled, decreasing component wear by limiting or preventing unwanted substances from entering the flexible connector mechanism, decreasing electrical arcing and other potentially harmful conditions between electrical components, preventing accidental component slippage, uncoupling and/or de-mating during vehicle operation, shock absorption, among other examples.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. The electric scooter 110 and the electric bicycle 130 are provided as example light electric vehicles and, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables a user, using a client application executing on a computing device, to locate, request, and/or reserve (e.g., rent or borrow for a duration of time) one or more light electric vehicles.

In some examples, the network service includes one or more computing systems or servers that are remote from the computing device of the user and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the user receives, from the network service over the network communication channel, information about a location of one or more of the light electric vehicles. The location of each of the light electric vehicles can then be provided on a user interface of the client application.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The user interface of the client application displays the location information of the user and the light electric vehicles as different icons (or other such representations). Once the location information is displayed, the user may select an icon representing a type of light electric vehicle (e.g., an icon for an electric scooter 110 or an icon for an electric bicycle 130). The user interface of the client application then generates or determines a route (e.g., provides directions) from the user's current location to the selected light electric vehicle. Selection of one of the icons may also enable the user to reserve (e.g., place a hold on) the light electric vehicle (to ensure that the light electric vehicle will be at the determined location when the user arrives), rent the light electric vehicle and/or borrow the light electric vehicle for a period of time.

Each light electric vehicle and/or the network service may also include a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every 5 minutes, every 10 minutes, etc.). In yet other examples, the location tracking system may track the location of the light electric vehicle in real-time or substantially real-time when the light electric vehicle is rented or otherwise used by a user and may track location information at periodic intervals when the light electric vehicle has been reserved or is otherwise not is use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the user. This information may include a profile of the user (e.g., username, contact information, etc.) security credentials of the user (e.g., a password), historical usage data, payment information, and the like.

The one or more computing systems of the network service may also include a matching system. The matching system receives, manages or otherwise handles various requests from the user. The requests may include light electric vehicle rental requests and light electric vehicle reservation requests. For example, when a vehicle rental request is received from the client application executing on the user's computing device, the matching system may communicate with the location tracking system and determine which light electric vehicle should be matched with or otherwise assigned to the requesting user.

The one or more computing systems of the network service may also include a payment system that processes payment information of the user. For example, when a user rents and uses a light electric vehicle, the user may be charged for the usage based on a duration of use and/or a travel distance. Once the user has finished using the light electric vehicle (e.g., by arriving at their intended destination, a check-in point, a battery kiosk 150, etc.), the payment system may automatically process the payment information of the user.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the user and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual user may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the user. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the user. When this occurs, the user may be directed to a rechargeable battery kiosk 150. For example, the network service can transmit data, over one or more networks, to the computing device to cause the computing device to display information about a particular rechargeable battery kiosk 150 to travel to.

When the user arrives at the rechargeable battery kiosk 150, the user may exchange the light electric vehicle's current battery with another rechargeable battery housed by the rechargeable battery kiosk 150, thereby enabling the light electric vehicle to continue or resume operation. In some instances, the user can use the client application executing on the computing device of the user to locate and/or select a rechargeable battery kiosk 150, receive directions to the rechargeable battery kiosk 150, and initiate a battery swap with the rechargeable battery kiosk 150 when the user arrives at its location.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when a user is traveling through the geographic region on an light electric vehicle and wants or needs to exchange the light electric vehicle's current rechargeable battery for one that has more charge, the user may be directed (e.g., via the client application executing on the user's computing device) to the rechargeable battery kiosk 150 associated with the geographic region. When the user arrives at the rechargeable battery kiosk 150, the user can exchange their current rechargeable battery for one that is fully charged or substantially fully charged. This enables the user to travel using a light electric vehicle across distances that may otherwise not be possible using the power provided by one charge of a rechargeable battery.

In some examples, the rechargeable battery kiosk 150 comprises a control system that communicates directly or indirectly with a computing device of the user when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an number of rechargeable batteries currently available at the rechargeable battery kiosk, and/or usage demand statistics.

Figure 2A:
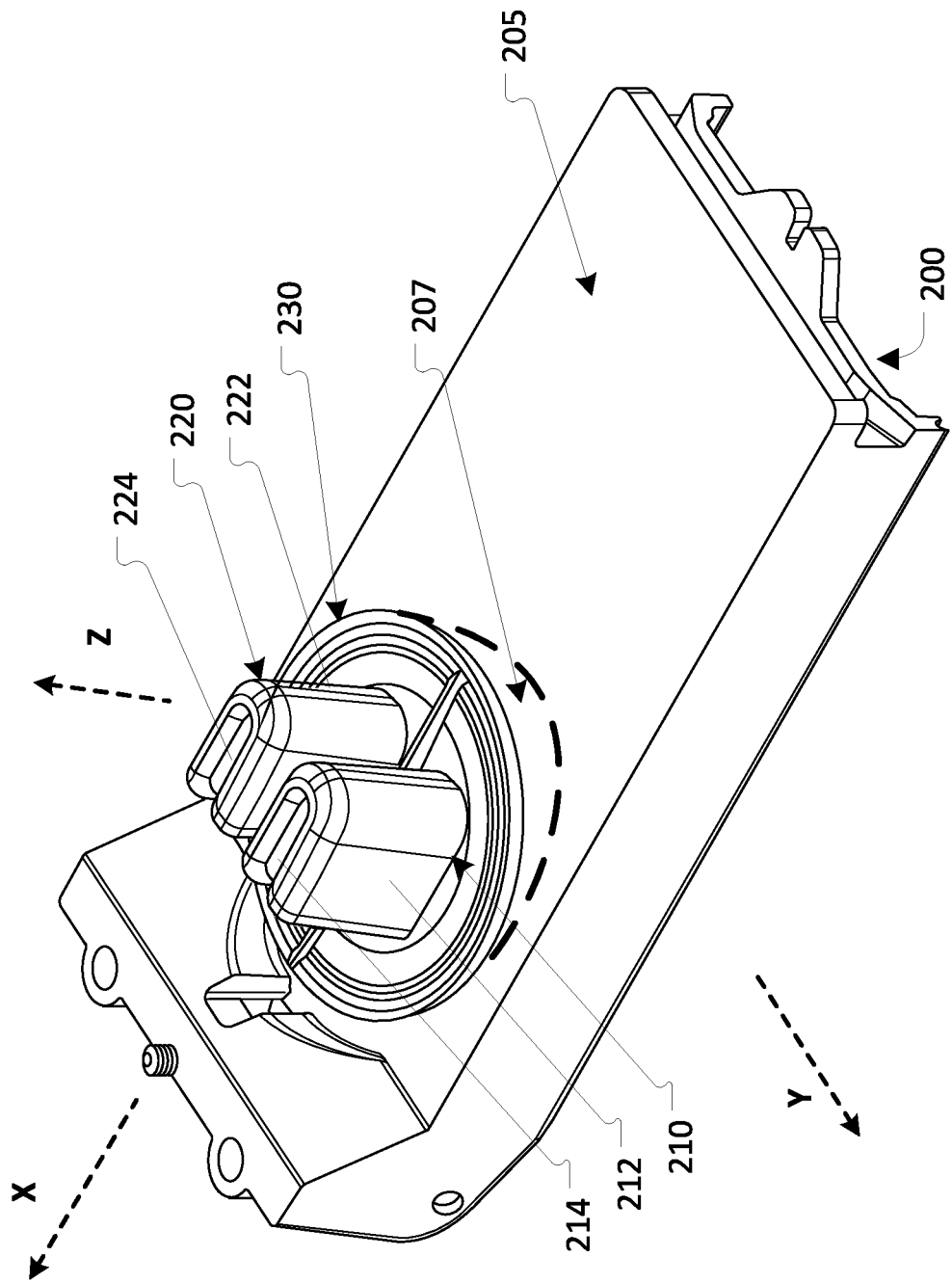
FIGS. 2A and 2B illustrate diagrams of an electronic module comprising the flexible connector mechanism according to one or more examples.
Figure 2B:
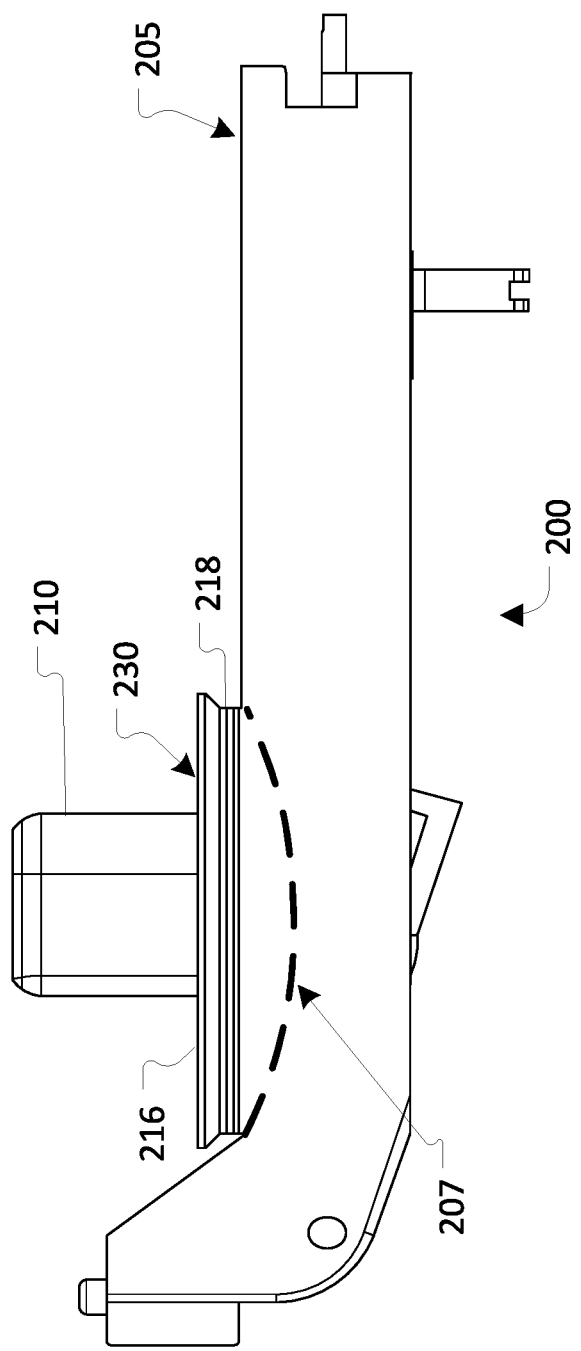

FIGS. 2A and 2B illustrate diagrams of an electronic module 200 comprising the flexible connector mechanism 230 according to one or more examples. In examples, electronic module 200 may be located in one or more of electric scooter 110, electric bicycle 130, or rechargeable battery kiosk 150. For example, electronic module 200 may be disposed on, or integrated into, battery holster 120, battery holster 140, or a battery receptacle of rechargeable battery kiosk 150. Although specific components for implementing electronic module 200 are described, one skilled in the art will appreciate that electronic module 200 may be implemented/integrated with several alternate components.

In some examples, electronic module 200 may comprise interface components 210, 220 and flexible connector mechanism 230. Alternately, electronic module 200 may comprise flexible connector mechanism 230, and flexible connector mechanism 230 may comprise interface components 210, 220. In a specific example, interface components 210, 220 may be disposed on a substantially planar surface 205 forming a base portion of electronic module 200. Although two interface components are shown in a specific configuration in FIG. 2, electronic module 200 may comprise any number of interface components and/or configurations. Interface components 210, 220 may extend from electronic module 200 and may comprise housing portions 212, 222 and electrical contact portions 214, 224. Alternately, interface components 210, 220 may extend from flexible connector mechanism 230. Housing portions 212, 222 may be at least partially composed of electrical insulation material(s) and may cover one or more sections of electrical contact portions 214, 224. Housing portions 212, 222 may have a U-shape with a curved side surface and an opening at the top configured to such that electrical contact portions 214, 224 can mate with battery electrodes. The top surfaces of housing portions 212, 222 may have a curved top surface to make it easier to mate a battery to the electronic module 200.

Flexible connector mechanism 230 may also be disposed on the substantially planar surface 205 that forms the base portion of electronic module 200. Substantially planar surface 205 may define a cavity 207 within which flexible connector mechanism 230 may be at least partially disposed. Although cavity 207 is shown as a spherical cavity extending a distance through the base portion of electronic module 200, any cavity design is contemplated. For instance, cavity 207 may be cylindrical, conical, or the like. Further, cavity 207 may extend through the entirety of (or only a portion of) the base portion of electronic module 200. Alternately, substantially planar surface 205 may not define a cavity and flexible connector mechanism 230 may be disposed on substantially planar surface 205. Flexible connector mechanism 230 may comprise a top portion 216 defining the perimeter of at least a portion of flexible connector mechanism 230 and a side portion 218 defining the height of flexible connector mechanism 230. In some examples, flexible connector mechanism 230 may be at least partially conical, such that an end of flexible connector mechanism 230 in contact electronic module 200 is tapered. In other examples, flexible connector mechanism 230 may have other shapes, such as spherical, cylindrical, etc. In at least one example, the flexible connector mechanism 230 may be or may comprise a flexible membrane.

In some examples, interface components 210, 220 may extend from or through flexible connector mechanism 230 (or a membrane thereof). In such examples, interface components 210, 220 may be attached to, or influenced by, flexible connector mechanism 230 such that an elasticity of flexible connector mechanism 230 may enable interface components 210, 220 to be manipulated along various axes of linear and/or rotational motion. For instance, flexible connector mechanism 230 may be made of rubber or a similar material consisting of relatively extended polymeric chains having high degrees of flexibility and mobility. The allowance of such motional manipulation may enable electrical contact portions 214, 224 of interface components 210, 220 to remain in contact with the electrical contacts of a device coupled to electronic module 200 while one or more of electronic module 200 or the device is in motion. As a specific example, electronic module 200 may be disposed on or otherwise integrated with a battery holster for a light electric vehicle. Electronic module 200 may be coupled to a power source, such as a battery for the light electric vehicle. The elasticity of flexible connector mechanism 230 may enable electronic module 200 and the power source to remain electrically connected despite shifting or vibrating of the power source (or the application of various forces to the power source) as a result of transit or other motional activities of the light electric vehicle.

In some examples, flexible connector mechanism 230 may possess an amount of impermeability and/or chemical resistance. The impermeability and/or chemical resistance may limit or prevent the unintended ingress of various substances when electronic module 200 is coupled to another device/module. For instance, continuing from the above example, the flexible connector mechanism 230 may be comprised of one or more materials that limit or prevent substances (e.g., water, dust, etc.) from entering flexible connector mechanism 230 when electronic module 200 is coupled to the power source. As a result of such impermeability and/or chemical resistance, flexible connector mechanism 230 may mitigate the impact of factors contributing to the wear and/or inoperability of electronic module 200 and/or a device/module coupled to electronic module 200.

Figure 3:
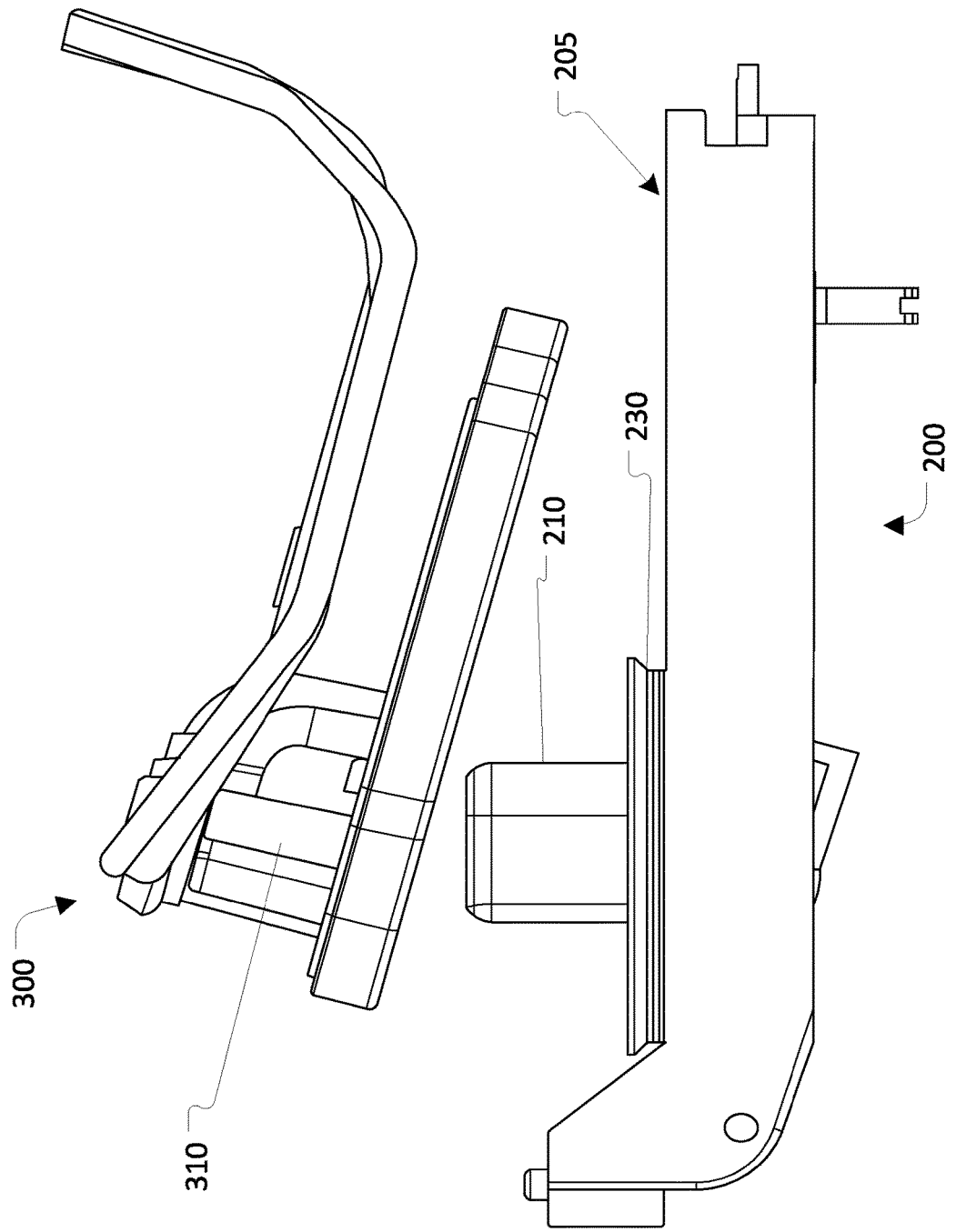
FIG. 3 illustrates a diagram of a battery module being applied to an electronic module comprising the flexible connector mechanism according to one or more examples.

FIG. 3 illustrates a diagram of a device being applied to an electronic module comprising the flexible connector mechanism. As shown, device 300 is being applied to electronic module 200 such that interface component 210 will be inserted into receiving cavity 310 of device 300 and interface component 220 (not visible) will be inserted into an alternate receiving cavity (not shown) of device 300. In examples, device 300 may be a power supply (such as one or more battery units), a diagnostic unit, or the like. Receiving cavity 310 may comprise an electrical contact (not shown) that contacts electrical contact portion 214 (not visible) of interface component 210 when device 300 has been applied to electronic module 200. In examples, flexible connector mechanism 230 may facilitate aligning the electrical contact of device 300 and electrical contact portion 214 as the device 300 is being applied to electronic module 200. As one example, interface components 210, 220 (not visible in FIG. 3) and flexible connector mechanism 230 may possess a default position when not coupled (or not being coupled) to another device/module. In the default position, the top portion of flexible connector mechanism 230 (or at least the perimeter edge thereof) may be substantially parallel to substantially planar surface 205, and the side portion(s) of flexible connector mechanism 230 may be substantially perpendicular to substantially planar surface 205. As device 300 is being coupled to electronic module 200 (and after coupling), flexible connector mechanism 230 may be manipulated such that interface components 210, 220 may be moved linearly and/or rotationally about the x, y, and z axes of the substantially planar surface. The motional manipulation may cause interface components 210, 220 and flexible connector mechanism 230 to be arranged in an alternate position that is different from the default position. The alternate position may enable the electrical contact portions of electronic module 200 and device 300 to be aligned optimally (or at least functionally).

Figure 4:
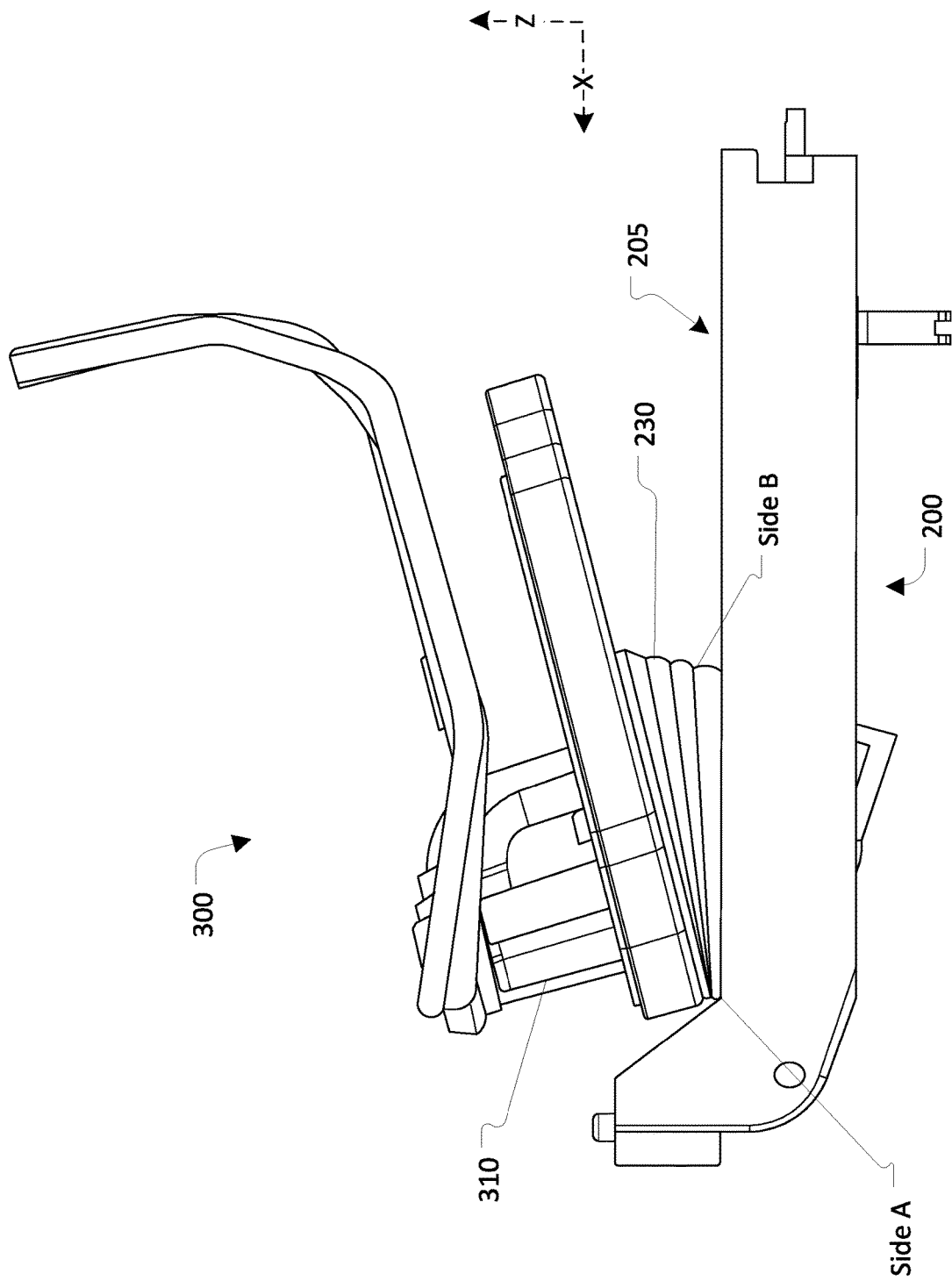
FIG. 4 illustrates a diagram of a battery module coupled to an electronic module comprising the flexible connector mechanism according to one or more examples.

FIG. 4 illustrates a diagram of a device coupled to an electronic module comprising the flexible connector mechanism. As shown, device 300 is applied to electronic module 200 such that interface component 210 (not visible) is inserted into receiving cavity 310. As a result of applying device 300 to electronic module 200, side A of flexible connector mechanism 230 has been compressed more than side B of flexible connector mechanism 230, indicating a tilt about the z axis of substantially planar surface 205. In accordance with the manipulation of flexible connector mechanism 230 about the z-axis, interface component 210 has been correspondingly tilted about the z-axis. The motional manipulation associated with the tilt about the z-axis enables electrical contact portion 214 (not visible) of interface component 210 to be in contact (or be coupled with) an electrical contact (not shown) of device 300. In examples, the motional manipulation afforded by flexible connector mechanism 230 prevents the misalignment of electronic module 200 and a coupled device/module during transit or other motional activities.

Figure 5:
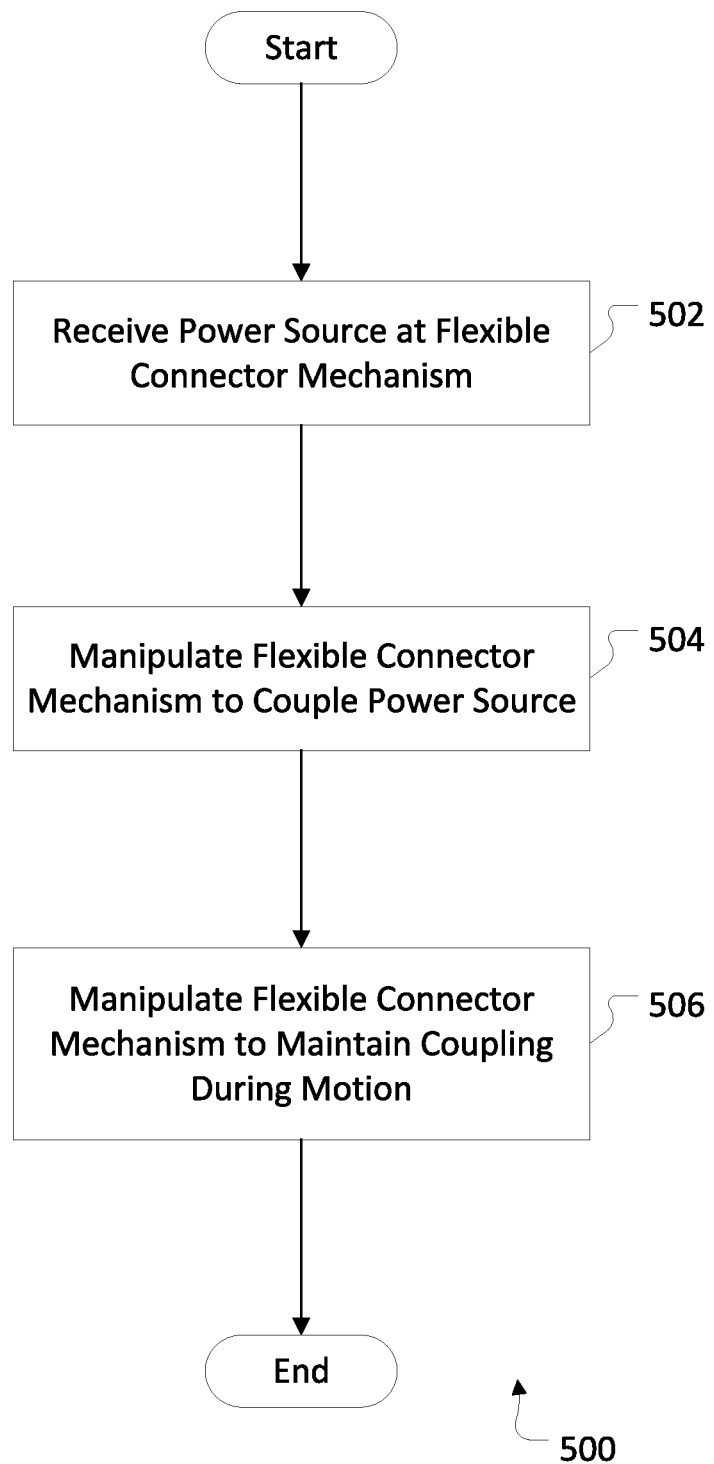
FIG. 5 illustrates an example method for coupling interfacing components using the flexible connector mechanism according to one or more examples.

FIG. 5 illustrates an example method for coupling interfacing components using a flexible connector mechanism, according to one or more examples. The method 500 shown and described with respect to FIG. 5 may be used by rechargeable battery kiosk 150, electric scooter 110, electric bicycle 130, and/or similar light electric vehicles or devices. In aspects, the flexible connector mechanism may be disposed on a light electric vehicle, a battery kiosk, and/or one or components associated therewith. As a specific example, the flexible connector mechanism may be incorporated into an electronic module, such as electronic module 200. The electronic module may facilitate an electrical connection and/or a communication link between one or more devices. For instance, the electronic module may enable wireless communication (e.g., via Near-Field Communication (NFC), Bluetooth, Zigbee, etc.) between an electric vehicle and a power supply. The electronic module may be integrated into, or disposed on, for example, a battery holster of an electric vehicle.

Method 500 begins when a power source is received (502) by a flexible connector mechanism. In aspects, a flexible connector mechanism, such as flexible connector mechanism 230, may be arranged in a default position while the flexible connector mechanism is not coupled to another device or component. In the default position, the flexible connector mechanism and/or one or more interface components associated therewith, such as interface components 210, 220, may be situated such that neither the flexible connector mechanism nor the interface component(s) are moved about, deflected from, or rotated about an x, y, or z axis of a surface to which the flexible connector mechanism is attached. For instance, the connector mechanism and/or one or more interface components associated therewith may be situated as shown in FIG. 3.

While in the default position, a power source, such as one or more battery units, or any other component may be received by the flexible connector mechanism. In some examples, the power source may be received by the flexible connector mechanism at an angle/direction that is deflected or rotated from the default position of the flexible connector mechanism. For instance, the power source may be received as shown in FIG. 4. Alternately, as a specific example, the power source may be received at an x-axis variation (from the default position) of +0.8 mm, a y-axis variation of −1.6 mm, and a y-axis rotation of +2.5 degrees. Although specific variations are given, these are for example purposes only. In either instance, the angle/direction at which the power source is received may prevent the power source from operating or may cause the power source to operate suboptimally. As one example, the angle/direction at which the power source is received may cause electrical contact portions of the power source and electrical contact portions associated with the flexible connector mechanism to be misaligned.

The flexible connector mechanism may be manipulated (504) to couple with the power source. In aspects, the flexible connector mechanism may be manipulated away from a default position to accommodate a power source that is received at an angle/direction that is different from the default position. An elasticity of the flexible connector mechanism may facilitate the manipulation of the flexible connector mechanism away from the default position, as described elsewhere herein. Based on the motional manipulation of the flexible connector mechanism, the corresponding interface component(s) may be correspondingly manipulated. For instance, continuing from the above example, to accommodate the power source being received, the flexible connector mechanism may be manipulated to a position that is an x-axis variation (from the default position) of approximately +0.8 mm, a y-axis variation of approximately −1.6 mm, and a y-axis rotation of approximately +2.5 degrees. As a result of the manipulation of the flexible connector mechanism, the interface component(s) may be correspondingly manipulated. For instance, the interface component(s) may be manipulated to a position that is an x-axis variation of approximately +0.8 mm, a y-axis variation of approximately −1.6 mm, and a y-axis rotation of approximately +2.5 degrees. The manipulation of the flexible connector mechanism and the interface component(s) may enable one or more portion of the interface component(s) (such as electrical contact portions 214, 224) to be aligned with corresponding portions of the received power source.

In some examples, aligning the portion of the interface component(s) with the corresponding portions of the received power source causes the power source to become mated/coupled to a device comprising the flexible connector mechanism. For instance, a battery unit may be mated/coupled to a battery holster for an electric vehicle where the battery holster comprises the flexible connector mechanism. When mated/coupled to the power source, the flexible connector mechanism (and the interface component(s)) may be situated such that the flexible connector mechanism limits or prevents undesired substances (e.g., water, dust, etc.) from entering the flexible connector mechanism. For instance, the flexible connector mechanism may form a seal that limits or prevents undesired substances from reaching the interface component(s) of either coupled device.

The flexible connector mechanism may also be manipulated (506) to enable the received power source to remain coupled during motion. In aspects, after the power source has been coupled to a device or component comprising the flexible connector mechanism, one or more forces (e.g., gravitational, centripetal, frictional, etc.) may be applied to the flexible connector mechanism and/or the device or component coupled to the flexible connector mechanism. For instance, various transit-related forces may be applied to a battery holster comprising the flexible connector mechanism and a coupled battery unit as a light electric vehicle is being piloted by a user. The flexible connector mechanism may enable the power source to remain coupled/mated to a device or component comprising the flexible connector mechanism by shifting or manipulating a position or shape of the flexible connector mechanism in accordance with a received force.

As one example, a user piloting a light electric vehicle may suddenly decelerate the light electric vehicle to avoid a collision. As a result of the deceleration, one or more forces may be applied to a battery unit attached to the light electric vehicle. A flexible connector mechanism attached to the battery holster of the flexible connector mechanism may be motionally manipulated in one or more directions such that the battery holster and the battery unit remain coupled during the deceleration. In another example, the user piloting the light electric vehicle may hit a bump or rut in the road, ride off of a curb or simply be riding down the road. Like the example above, one or more forces may be applied to the battery unit during each of these examples. Regardless of the circumstances, the flexible connector mechanism may be motionally manipulated as previously described such that the battery holster and the battery unit remain coupled.

Figure 6:
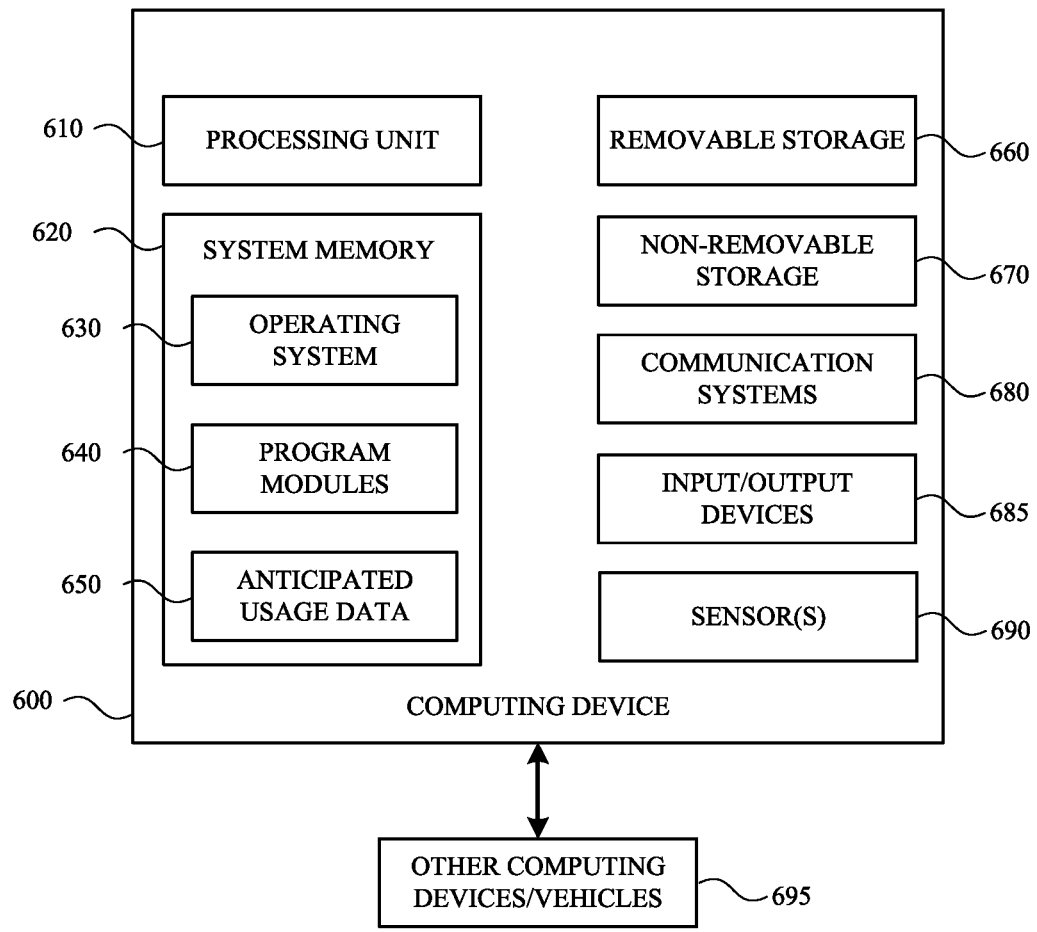
FIG. 6 is a system diagram of a computing device that may be integrated with, or utilized by, the flexible connector mechanism described herein.

FIG. 6 is a system diagram of a computing device 600 according to an example. The computing device 600 may be integrated with or associated with a light electric vehicle, such as the electric scooter(s) 110 and/or the electric bicycle(s) 130 shown and described with respect to FIG. 1. A computing device 600 may also be associated or otherwise integrated with the battery kiosk 210 and the rechargeable battery kiosk(s) 150. Additionally, a computing device 600 may be integrated or otherwise associated with various systems shown and described with respect to FIG. 1-FIG. 2. As shown in FIG. 6, the physical components (e.g., hardware) of the computing are illustrated and these physical components may be used to practice the various aspects of the present disclosure.

The computing device 600 may include at least one processing unit 610 and a system memory 620 or memory resource. The system memory 620 or memory resource may include, but is not limited to, volatile storage (e.g., random access memory), non-volatile storage (e.g., read-only memory), flash memory, or any combination of such memories. The system memory 620 may also include an operating system 630 that control the operation of the computing device 600 and one or more program modules 640. The program modules 640 may be responsible for gathering, receiving and/or determining anticipated usage data 650 and/or charging rates for one or more rechargeable batteries such as described above. The system memory 620 may also store this information or otherwise provide access to this information. A number of different program modules and data files may be stored in the system memory 620. While executing on the processing unit 610, the program modules 640 may perform the various operations described above.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 600 may include one or more communication systems 680 that enable the light electric vehicles to communicate with rechargeable batteries, rechargeable battery kiosks, other light electric vehicles, other computing devices 695, a network service and the like. Examples of communication systems 680 include, but are not limited to, radio frequency (RF) transmitter, receiver, and/or transceiver circuitry, a Controller Area Network (CAN) bus, a universal serial bus (USB), parallel, and/or serial ports.

The computing device 600 may also have one or more input devices and/or one or more output devices shown as input/output devices 685. These input/output devices 685 may include a keyboard, a sound or voice input device, haptic devices, a touch, force and/or swipe input device, a display, speakers, etc. The aforementioned devices are examples and others may be used.

The computing device 600 may also include one or more sensors 690. The sensors may be used to detect or otherwise provide information about the operating condition of the light electric vehicle, a rechargeable battery and/or a rechargeable battery kiosk. In other examples, the sensors 690 may provide information about a light electric vehicle to which the computing device 600 is associated. For example, the sensors 690 may include a heat sensor, a charge sensor or other such rechargeable battery sensors.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A battery holster for receiving a rechargeable battery for a light electric vehicle, the battery holster comprising:
   a substantially planar surface forming a base portion of the battery holster, the substantially planar surface defining a cavity;
   a flexible connector portion at least partially disposed on the substantially planar surface defining the cavity; and
   a first electrical contact extending from the flexible connector portion and adapted to mate with a second electrical contact of the rechargeable battery when the rechargeable battery is removeably coupled to the battery holster, wherein the flexible connector portion enables the first electrical contact to be manipulated about a plurality of axes of the substantially planar surface when the first electrical contact mates with the second electrical contact of the rechargeable battery.

2. The battery holster of claim 1, wherein the battery holster is implemented in at least one of: an electric scooter, an electric bicycle, or a kiosk.

3. The battery holster of claim 1, wherein the flexible connector portion comprises a top portion defining a perimeter of the flexible connector portion and a side portion defining a height of the flexible connector portion.

4. The battery holster of claim 1, wherein the flexible connector portion comprises a flexible membrane.

5. The battery holster of claim 1, wherein the flexible connector portion is comprised of one or more materials consisting of extended polymeric chains having high degrees of flexibility and mobility.

6. The battery holster of claim 1, wherein the flexible connector portion enables the first electrical contact to be manipulated about the plurality of axes of the substantially planar surface when the light electric vehicle is in motion.

7. The battery holster of claim 1, wherein the flexible connector portion enables the first electrical contact and the second electrical contact to remain mated despite shifting or vibration of the rechargeable battery during operation of the light electric vehicle.

8. The battery holster of claim 1, wherein the flexible connector portion limits or prevents an ingress of unintended substances when the first electrical contact and the second electrical contact are mated.

9. A receiving portion for receiving a power source for a light electric vehicle, the receiving portion comprising:
   a substantially planar surface forming a base portion of the receiving portion, the substantially planar surface defining a cavity;
   a flexible membrane at least partially disposed within the cavity; and
   a first electrical contact extending from the flexible membrane and adapted to mate with a first electrical contact of the power source when the power source is removeably coupled to the receiving portion, wherein the flexible membrane enables the first electrical contact extending from the flexible membrane to be manipulated about a plurality of axes of the substantially planar surface when the first electrical contact extending from the flexible membrane mates with the first electric contact of the power source.

10. The receiving portion of claim 9, wherein the first electrical contact is disposed on the flexible membrane and comprises a housing portion, the housing portion covering at least a portion of the first electrical contact and comprised of one or more electrical insulation materials, wherein the housing portion comprises a U-shaped sidewall and a curved top surface.

11. The receiving portion of claim 9, wherein the flexible membrane forms a seal when the first electrical contact extending from the flexible membrane and the first electrical contact of the power source are mated, the seal limiting or preventing an ingress of unintended substances.

12. The receiving portion of claim 9, wherein manipulation about the plurality of axes of the substantially planar surface includes manipulation about three axes of linear motion and manipulation about three rotational degrees of freedom.

13. The receiving portion of claim 9, the receiving portion further comprising:
   a second electrical contact extending from the flexible membrane and adapted to mate with a second electrical contact of the power source when the power source is removeably coupled to the receiving portion.

14. The receiving portion of claim 13, wherein the flexible membrane enables the first electrical contact extending from the flexible membrane to remain mated with the first electrical contact of the power source and the second electrical contact extending from the flexible membrane to remain mated with the second electrical contact of the power source when the power source is shifted or vibrated during operation of the light electric vehicle.

15. A method comprising:
    receiving a power source at a receiving portion of an electric vehicle, the receiving portion including a flexible connector portion, at least partially disposed in a cavity, comprising
    a first electrical contact extending from the flexible connector portion and adapted to mate with a second electrical contact of the power source when the power source is removeably coupled to the receiving portion;
    manipulating the flexible connector portion to couple the power source to the electric vehicle, wherein the flexible connector portion enables the first electrical contact to be manipulated about a plurality of axes of the receiving portion when the first electrical contact is mated with the second electric contact; and
    manipulating the flexible connector portion to maintain coupling of the power source to the receiving portion during motion of the electric vehicle.

16. The method of claim 15, wherein the flexible connector portion comprises a default configuration when the receiving portion is not coupled; and wherein the power source is not received at an angle consistent with the default configuration.

17. The method of claim 16, wherein, when the flexible connector portion is in a default position:
    the flexible connector portion is substantially parallel to a surface of the receiving portion on which the flexible connector portion is disposed; and
    the first electrical contact is substantially perpendicular to the surface of the receiving portion.

18. The method of claim 16, wherein manipulating the flexible connector portion to couple the power source to the electric vehicle comprises altering the default configuration of the flexible connector portion to substantially match a received angle of the power source.

19. The method of claim 18, wherein altering the default configuration of the flexible connector portion comprises compressing one or more portions of the flexible connector portion to match the received angle of the power source.

20. The method of claim 16, wherein decoupling the power source from the receiving portion causes the flexible connector portion to return to the default configuration.

* * * * *